United States Patent [19]
Trumbull

[11] Patent Number: 6,118,763
[45] Date of Patent: Sep. 12, 2000

[54] TRANSMISSION OF VOICE OVER AN ASYNCHRONOUS NETWORK

[75] Inventor: Dean A. Trumbull, Duluth, Ga.

[73] Assignee: Inventions, Inc., Norcross, Ga.

[21] Appl. No.: 08/934,025

[22] Filed: Sep. 19, 1997

Related U.S. Application Data

[60] Provisional application No. 60/026,850, Sep. 27, 1996, provisional application No. 60/028,689, Oct. 18, 1996, and provisional application No. 60/030,907, Nov. 12, 1996.

[51] Int. Cl.[7] .............................. H04L 12/56; H04J 3/24; G04F 5/00
[52] U.S. Cl. ......................... 370/231; 370/395; 370/474
[58] Field of Search .................................... 370/230, 231, 370/390, 392, 395, 471, 474, 472, 473, 391, 232

[56] References Cited

U.S. PATENT DOCUMENTS

| | | | |
|---|---|---|---|
| 5,432,713 | 7/1995 | Takeo et al. ............................. | 370/230 |
| 5,502,723 | 3/1996 | Sanders ................................... | 370/431 |
| 5,572,521 | 11/1996 | Pauwels et al. ........................ | 370/471 |
| 5,712,854 | 1/1998 | Dieudonne et al. .................... | 370/394 |
| 5,768,270 | 6/1998 | Ha-Duong ............................... | 370/390 |

*Primary Examiner*—Alpus H. Hsu
*Assistant Examiner*—Afsar M. Qureshi
*Attorney, Agent, or Firm*—Charles L. Warner; Troutman Sanders, LLP

[57] ABSTRACT

An SCSA RX/TX memory (220) receives voice data and stores voice data samples under established voice channel identifiers. A controller (240) selects voice channels, and their associated voice data, for inclusion in an ATM cell. The memory (220) sends the voice channel identifier and the voice data for the selected channels to a Constant Bit Rate Segmentation And Reassembly (CBR SAR) circuit (225). The CBR SAR aggregates the voice data into an appropriate number of ATM cell slots for each of those voice channels. The CBR SAR 225 sends the aggregated information to a Multiplexer/Duplicator Circuit (MUX/DUP) (230) which assembles the ATM cell, and sends the completed ATM cell to an ATM transceiver (265) for transmission. When there is no voice data to be sent information data from an Available Bit Rate (ABR) SAR (260) is assembled to form an ATM cell to be sent by the ATM transceiver. The MUX/DUP also receives an ATM cell from the ATM transceiver, duplicates the ATM cell, sends one copy of the ATM cell to the CBR SAR, and one copy of the ATM cell to the ABR SAR. The SARs disassemble the ATM cell, verify the channel identifiers, and route any valid channel identifiers and associated data to their respective memories. The SCSA memory attaches a channel identifier number to each voice data sample and sends the combination to the SCSA interface, which then places the combination on the SCSA port (210). A host device causes the information data to be read from the DATA memory via PCI ports (245) via a DMA operation.

9 Claims, 5 Drawing Sheets

TRANSMISSION OF VOICE OVER AN ASYNCHRONOUS NETWORK

CROSS-REFERENCE TO RELATED APPLICATIONS

This application claims the benefit of U.S. Provisional Patent Application Ser. No. 60/026,850, filed Sep. 27, 1996; U.S. Provisional Patent Application Ser. No. 60/028,689, filed Oct. 18, 1996; and U.S. Provisional Patent Application Ser. No. 60/030,907, filed Nov. 12, 1996.

FIELD OF THE INVENTION

The present invention relates to data communication systems. More particularly, the present invention relates to an apparatus and method for transmitting isochronous digital data, such as digitized voice signals, over an asynchronous digital network in an efficient manner.

BACKGROUND OF THE INVENTION

Telephony switching architectures are the framework for establishing voice communications between users conducting a conversation over the telephone. Traditionally, telephone switching systems have been dedicated devices which serve only the purpose of establishing and releasing telephone connections. However, recent developments in telecommunications merged telephone switching services with computer networks and services. The result, Computer-Telephony Integration (CTI), provides many advantages, such as the ability to program the telephone system components, and the ability of a called party or a system at a called number to respond to an incoming call based on the Caller Identification information provided for the call.

Current telephony switching architectures employ synchronous networks to connect geographically distributed telephony servers, nodes, systems, and parties. Conventional synchronous networks carry data in a very controlled manner: packets must be transmitted at specified, fixed time intervals, even if there is no data to be transmitted. This can result in inefficiency because some of the bandwidth may be consumed by empty packets being transmitted, and the transmission of empty packets limits the actual data transfer rate through the network. Thus, while conventional synchronous network protocols are useful for the synchronous data flow needs of voice and video communications, they do not make maximum use of the available bandwidth.

The Asynchronous Transmission Mode (ATM) protocol is a network protocol which can provide increased efficiency. The specifications for the ATM protocol are available from the ATM Forum, Mountain View, California, USA. ATM is an asynchronous, high bandwidth, low-delay, packet-like switching and multiplexing technique. Generally, ATM transmits information in 53-octet, fixed-size cells, typically consisting of a 48-octet payload field and a 5-octet header field. However, some adaptation layers deviate from this. ATM allocates bytes (bandwidth) on demand to the services utilizing the ATM link, thus allowing it to be more efficient than synchronous network protocols. The ATM protocol provides multiple packet formats, which are referred to as "adaptation layers," and are used for transmitting different kinds of data.

ATM Adaptation Layer AAL1 is a constant bit rate (CBR) protocol. The AAL1 standard provides for a 7 byte header, and a 46 byte packet data unit (PDU) payload (a "P format" cell), or a 6 byte header and a 47 byte PDU (a "non-P format" cell). "P format" cells alternate with "non-P format" cells. There is no integrity check on the data. This layer is designed for circuit emulation and it is assumed that the data is being sent to one or more devices which can "interpret" it (e.g., convert it into sound), and which do not request retransmission of the data. This standard is used for data that is connection-oriented and delay-intolerant.

Voice signals and video signals are isochronous, meaning that the reproduced signal must be recreated at the same frequency at which the original signal was captured. The isochronous data from voice and video signals is therefore intolerant of variations in transmission delay. Failure to recreate the signal at the original signal can cause the reproduced signal to be distorted or even to be incomprehensible to the person receiving the transmission. The AAL1 standard is thus particularly important to the telephony industry because it reduces the variability of the transmission delay. The CBR format is also the highest priority adaptation layer available to user data. The CBR format thus allows voice and other isochronous signals to be transmitted over an ATM link, and still be meaningfully reproduced at the receiving end. Under the CBR format, the PDU from the source is encapsulated and a time-tag is then added as a header or trailer to the PDU. The time-tag is used to maintain a constant timing relation between the source and destination. The PDU and the time-tag form a packet which is then segmented into ATM cells.

ATM Adaptation Layer AAL5 is an available bit rate (ABR) or Variable Bit Rate (VBR) protocol. The AAL5 standard provides for a 5 byte header, and a 48 byte PDU. This layer is designed to transfer non-synchronous, delay-tolerant data, such as network management data, files, documents, applications, spreadsheets, records, etc. Unlike the CBR format, the ABR format contains no provision for maintaining the constant timing relation between the source and destination. However, this format is designed for maximum throughput efficiency, and is particularly well suited for transmitting many types of computer data. The ABR format adds a minimal header or trailer to the protocol data unit before segmenting it into ATM cells.

Thus, input data may be categorized according to whether there is a need to maintain a constant bit rate between the source of the data and the destination of the data. The input data are encapsulated according to the appropriate adaptation layer for that type of data, and are segmented into payloads which are to be transmitted as ATM cells over an ATM link.

However, there are problems with applying the ATM technology in the area of telephony. The ATM specifications prohibit the transmission of empty cells. Therefore, if AAL1 is to be used to transmit voice, then the digitized voice signals must be buffered until the payload of the CBR format is filled before the asynchronous ATM cell may be transmitted. The industry standard method of digitizing voice signals, Pulse Code Modulation (PCM), operates by sampling the analog voice signal once every 125 microseconds, or 8000 times per second. Each sample is converted to an 8-bit (1 octet) digital voice word. Consequently, it takes 5.75 milliseconds to fill a 46 octet PDU (46 octets times 125 microseconds per octet=5.75 milliseconds). In and of itself, this 5.75 millisecond delay might not be a major problem if it were a fixed delay.

However, telephony network communication lines are not unidirectional lines, but are bidirectional lines where signals flow in both directions along the lines. Thus, a device will send signals and receive signals on the same line. Bridged taps, wire gauge changes, and wire splices can cause a portion of the transmitted signal to be reflected back to the transmitting end. This is referred to as an echo. This reflected transmitted signal can be mistaken for, or can distort, the incoming received signal. This may not be much of a problem when the "device" which sends and receives the signal is a human and an analog line is used. However, an echo can be disconcerting even to a human if the echo is too loud or is too delayed. Further, an echo can be a serious problem for digital data transmission devices. The reflected signal will change the phase and/or amplitude of the incoming signal, and can alter or completely destroy the information sent by the other device. Thus, echo adversely affects the validity of received digital data. Further, even if a human is the end "device", echo is a problem because the voice signal is converted to a digital signal for transmission, and the echo may cause the incoming signal to be a series of bits which do not produce a meaningful sound.

Therefore, data transmission devices, such as modems and telephone systems, typically employ some form of echo suppression. Echo suppression is implemented by the transmitting device storing or remembering the transmitted signal, and then subtracting a portion of this stored transmitted signal from the received signal so as to cancel any echo. The echo suppression capability of the transmitting device is limited by how long the device retains the transmitted signal.

Conventional off-the-shelf echo removal devices (hardware and software) are designed to correct for echoes if the round-trip delay of the voice signal is 2 milliseconds or less, a design choice based on cost and other considerations. These off-the-shelf devices are not designed to remove echoes where the round-trip delay is greater than 2 milliseconds. In the example given above, it takes 5.75 milliseconds to fill an ATM cell. Thus, the 2 millisecond limit will have been exceeded before the ATM cell is even transmitted. Therefore, there is a problem with sending ATM cells quickly enough to meet the requirements of voice transmission while not sending cells which have only a single voice sample.

Therefore, a need exists for adapting ATM technology to the area of telephony such that there is a continuous flow of PCM samples between transmitter and receiver, with no more than 2 milliseconds of transmission delay, and with no empty packets.

A problem with adapting the ATM technology to the area of telephony is the problem of distinguishing between digitized voice signals and ordinary digital computer data. Although there are clear definitions for the CBR voice format (AAL1) and the ABR data cell format (AAL5), it is frequently difficult to be absolutely certain that an incoming cell is one or the other. This is a problem because an ATM interface can support two or more local devices, and they may receive similar or different types of data. For example, one device may receive CBR data, while the other device receives ABR data. The ATM interface may not be able to easily and quickly identify which device is the intended recipient of a particular received cell. Further, analysis of the incoming ATM cell payload is unreliable and thus does not provide a solution to this problem.

With ATM network interfaces that support both local CBR and local ABR devices, ensuring that an incoming cell is not misdirected away from the intended recipient is very important. Although the recipient of a misdirected cell can disregard that cell without adverse effect, the intended recipient of a misdirected cell cannot recreate that misdirected cell, and so data will be lost, possibly irretrievably.

Accordingly, a need exists for directing both digitized voice data and ordinary digital computer data in a manner which ensures that a cell of received information will always be received by the intended recipient device.

SUMMARY OF THE INVENTION

The present invention provides a high efficiency method for transmitting voice signals over an ATM network. In the preferred embodiment, a network interface card bridges between devices which operate on an industry standard digitized voice data architecture, such as the Signal Computing System Architecture (SCSA) time division multiplexed (TDM) bus. The network interface card allows data to be transmitted over a network link from one SCSA bus to another SCSA bus in a much more efficient and responsive manner than with conventional synchronous network interface cards. The network interface card preferably resides in a host computer which operates on an industry standard computer architecture, such as Peripheral Component Interconnect (PCI), Industry Standard Architecture (ISA), Small Computer System Interface (SCSI), or the like. The present invention uses an ATM network to provide a high-performance, asynchronous telephony switching architecture.

The SCSA specifications allow the data being transmitted over an SCSA bus to be divided into as many as 1,024 separate TDM channels. Each channel carries the digitized voice data for an individual virtual circuit, or group of individual virtual circuits. A virtual circuit is a logical or virtual connection between two points. A virtual circuit is similar to a physical connection in that it is dedicated to the two endpoints. A virtual circuit differs from a physical connection in that multiple virtual circuits can exist over a single physical connection, and each virtual circuit can have a different defined end points and/or a different defined quality of service. An ATM cell includes an identifier field within the header field, and this identifier field identifies the virtual circuit (virtual path ID, virtual channel ID) to which the payload information belongs. Circuitry at each end of the virtual connection encodes or decodes the identifier field to route the data properly and thereby maintain the integrity of the connection. In addition, an AAL1 cell has a field which is used to carry clock information.

The present invention overcomes the problem of sending ATM cells quickly enough to meet the requirements of voice transmission while not sending empty or mostly empty cells, through voice channel aggregation. Voice channel aggregation is achieved in the following manner. Each TDM channel on the SCSA bus is allocated a time division "slot" in an ATM transmission cell, and different TDM channels may appear in different ATM cells. At 125 microsecond intervals, the TDM channels specified for a particular ATM cell are sampled simultaneously, and each sample is moved into its allocated slot. The 125 microsecond interval corresponds to the PCM sample rate of an analog voice signal. In this manner, the ATM cell can be filled and transmitted sooner. For example, if 46 TDM time slots are aggregated, one octet of the ATM cell payload would be allocated to each of the 46 TDM channels. Thus, at every 125 microsecond interval, the ATM cell would be completely filled and would be immediately transmitted.

However, there may not be 46 TDM channels which require voice data transmission. Therefore, the present invention provides for placing up to eight samples for a TDM channel into an ATM cell. If there are 6 TDM channels open, then one entire ATM cell will be filled, and there will be two TDM octets left over to go into the next ATM cell. If there are not enough TDM channel data to fill an ATM cell, the cell will be filled with the available voice data, up to eight samples per voice channel, and then transmitted. In this case some of the payload bytes may be empty (filled with null data). However, even when only one TDM channel is active, eight voice octets for that channel will be placed in each ATM cell so only one ATM cell will be sent, rather than eight ATM cells. Thus, the present invention improves the efficiency of the voice transmission, even when there are few active voice channels.

Therefore, the present invention provides the ability to aggregate digitized voice data signals for transmission over an asynchronous network in an efficient manner while still maintaining the ability to remove unwanted echoes with off-the-shelf echo-removal hardware. It will be apparent to those skilled in the art that sampling intervals other than 125 microseconds could be employed while still achieving the same result. However, a greater sampling rate is less efficient, and a lower sampling rate may cause "aliasing". Preferably, not less than six TDM channels are aggregated, with up to eight voice data words loaded from each TDM channel. Eight data words, times 125 microseconds per data word, results in a delay of one millisecond on each TDM channel. This is well within the 2 millisecond echo-removal threshold discussed above.

The present invention also overcomes the possibility that an ATM cell received over the ATM link will be misdirected and not reach its intended destination. Initially, each received ATM cell is duplicated and forwarded to all of the local devices supported by the ATM interface. A receiving device will automatically discard a forwarded cell which is not matched to a virtual circuit recognized by that device. Thus, each device receives those cells intended for it but automatically filters out unneeded forwarded cells. This process results in a 100% confidence factor that the received cell will be forwarded to the proper receiving device. After the channels associated with each data type (CBR, ABR) have been determined then the ATM cells are no longer duplicated but are routed only to the intended destination.

Therefore, the present invention provides for using a high-performance asynchronous communication network to support both ordinary digital computer data and the demanding throughput of isochronous voice and video signals.

These and other features, advantages, and aspects of the present invention may be more clearly understood and appreciated from a review of the following detailed description of the disclosed embodiments and by reference to the appended drawings and claims.

DETAILED DESCRIPTION OF THE INVENTION

Figure 1:
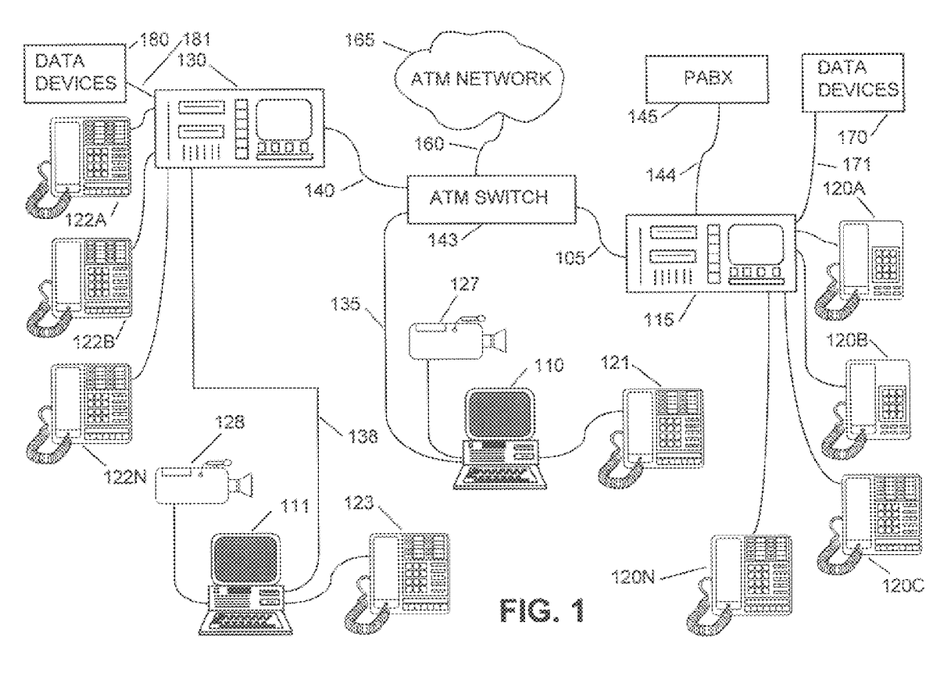
FIG. 1 is a diagram of the preferred embodiment of the present invention in its preferred environment.

FIG. 1 is a diagram of the preferred embodiment of the present invention in its preferred environment. A distributed telephony switching architecture, such as might be used within a business or other organization, has internal links 105, 135, 140 connected to an ATM switch, server, or "hub" 143. The ATM switch 143 is connected to an external ATM network 165 via an ATM link 160.

Analog telephones 120A–120B and PABX 145 are connected to server 115. The PABX 145 is connected to a plurality of analog telephone devices (not shown), such as telephones, modems, fax servers or machines, etc. The PABX 145 may also be connected to a plurality of telephone trunks (not shown). Also, digital telephones 120C–120N, such as a Basic Rate ISDN (BRI) telephones or other digital telephones, are connected to the server 115. In addition, the server 115 is connected via a network 171 to a plurality of data devices 170, such as hosts, data base servers, etc. The network 171 may be any convenient type of network, such as local area network, wide area network, etc. The server 115 is connected to the ATM switch 143 via the link 105.

A digital telephone 121, and a video camera 127 are connected to a multimedia personal computer 110, which is connected to the link 135. The personal computer 110, the telephone 121, and the camera 127 may be used independently, or may be used together as a videoconferencing station.

Digital telephones 122A–122N are connected to a server 130, which is connected to link 140. In addition, the server 130 is connected via a network 181 to a plurality of data devices 180, such as hosts, data base servers, etc. The network 181 may be any convenient type of network, such as local area network, wide area network, etc. A server 115, 130 may be device-type-specific server, such as an analog server which only handles analog telephones or a digital server which only handles digital (ISDN/BRI) telephones, or it may be a server which handles both analog and digital telephones.

Another digital telephone 123 and another video camera 128 are connected to another multimedia personal computer 111. The personal computer 111, the telephone 123, and the camera 128 may be used independently, or may be used together as a videoconferencing station. The personal computer 111 is connected via a link 138 to the server 130.

In the preferred embodiment, the links 105, 135, and 140 are all 25.6 Megabits per second (Mbps) ATM links, as provided for by the ATM specification for private networks. The ATM link 160 may be at any speed defined by the ATM specification for connection to, or over, the public switched telephone network, but is preferably at least a 44.736 Mbps link, such as the ATM DS-3 standard. Link 138 is preferably an analog link or a BRI/ISDN type link, but may be any link suitable for transmission of the desired information. Any link 105, 135, 138, 140, 160 may comprise multiple links so as to provide for a greater bandwidth if necessary.

The ATM switch 143 allows connected devices (such as the analog telephones, the digital telephones, the PABX, the personal computers), and the data devices, to communicate with each other (internal communications) and to communicate with other devices (not shown) which are connected via the link 160 and the external ATM network 165 (external communications). Thus, the telephone 120A may be used to conduct a voice communication with the telephone 122A, the telephone 122B may be used to conduct a voice communication with another telephone (not shown) connected via the PABX 145, and the telephone 121, the video camera 127 and the computer 110 may be used to conduct a videoteleconferencing session either with another party (not shown) over the ATM network 165 or with a party at the telephone 123, the camera 128, and the computer 111. Also, multiple devices may be connected together to create a conference call or session. For example, telephone 120A may be used to conduct a voice communication simultaneously with both telephone 122A and telephone 120B. Also, data devices 170 may be exchanging data with data devices 180.

Device 145 is shown as an analog device (PABX) purely by way of example and it should be understood that the device 145 may be a digital PBX, digital automatic call distributor (ACD), analog ACD, proprietary digital or analog switch, a single component, a plurality of components, etc. Also, although devices 110 and 111 are described as multimedia personal computers, there is no requirement that they have multimedia capabilities. They could be personal computers which do not support connections to telephones and/or video cameras, in which case the telephones 121, 123 and/or the cameras 127, 128 could be connected directly to a server 115, 130 or to another device, such as the PABX 145.

Devices 110, 115, 130 and 143 each contain one of more network interface cards, or are connected to one or more equivalent external components (not shown), to allow communication over an ATM link. In the example shown, computer 110 and server 115 would each have a network interface card to support their respective ATM links 135, 105. The ATM switch 143 would have four ATM network interface ports to support its four ATM links 105, 135, 140, 160.

In the preferred embodiment, the network interface card is a PCI-compatible card and is operable in any computer which features full length PCI slots. It is envisioned that advancements in component size reduction will allow the network interface card to be installed in any length PCI slot. The function and operation of the network interface card or equivalent external component is described beginning with FIG. 2 below.

The network interface card allows voice communications to be transferred efficiently via an ATM link. For example, the network interface card provides a bridge between a voice data bus, such as an SCSA bus, and a geographically remote voice or voice/data bus which is connected via the ATM network 165.

Although the preferred embodiment describes use with an SCSA bus, the present invention also may be used with other voice data busses, such as, for example, any TDM synchronous voice data bus, the Multi-Vendor Integration Protocol (MVIP) bus, the PCM Expansion Bus (PEB) protocol, and the Analog Expansion Bus (AEB) protocol. Also, in the preferred embodiment, the computer 110 bus architecture is the PCI bus, but the present invention also may be used with any computer data bus, including ISA, Extended ISA (EISA), VL-bus, SCSI or the like. Thus, the bus structure used by a device is generally not a critical factor.

Consider now a brief description of the operation of the present invention. Assume that a plurality of parties at a plurality of telephones 120A–120N wish to communicate with a plurality of parties at another plurality of telephones 122A–122N. The servers 115, 130 will communicate via ATM cells, through the ATM switch 143, to establish a plurality of voice channel identifiers, one voice channel identifier being for each voice channel to be established, such as one voice channel identifier being for a voice channel between telephones 120A and 122A, another voice channel identifier being for a voice channel between telephones 120B and 122B, etc. Each server 115, 130 is responsible for matching its connected telephone to the assigned voice channel identifier. The server 115 will then accumulate voice samples from the telephones 120 until it has filled an ATM cell or it has collected eight voice samples from at least one, and preferably six of the telephones 120. The server 115 will then send the completed ATM type AAL1 cell to the server 130 via the switch 143. The server 130 will disassemble the ATM cell, match the voice samples to the proper voice channels, and then send the voice samples to the proper telephones 122A–122N. Servers 115 and 130 reverse roles when voice samples are being sent from the telephones 122 to the telephones 120. It should be understand that the links are bidirectional links so that ATM cells are being sent from server 115 to server 130 at the same time that ATM cells are being sent from server 130 to server 115. The procedure of aggregating voice channels allows ATM cells to be sent at the required intervals for voice transmission and echo suppression, while providing that efficiency will be maintained by filling the ATM cells as completely as possible. When there is no voice data to be sent, ATM type AAL5 cells containing information data are sent, such as between devices 170 and 180.

Figure 2:
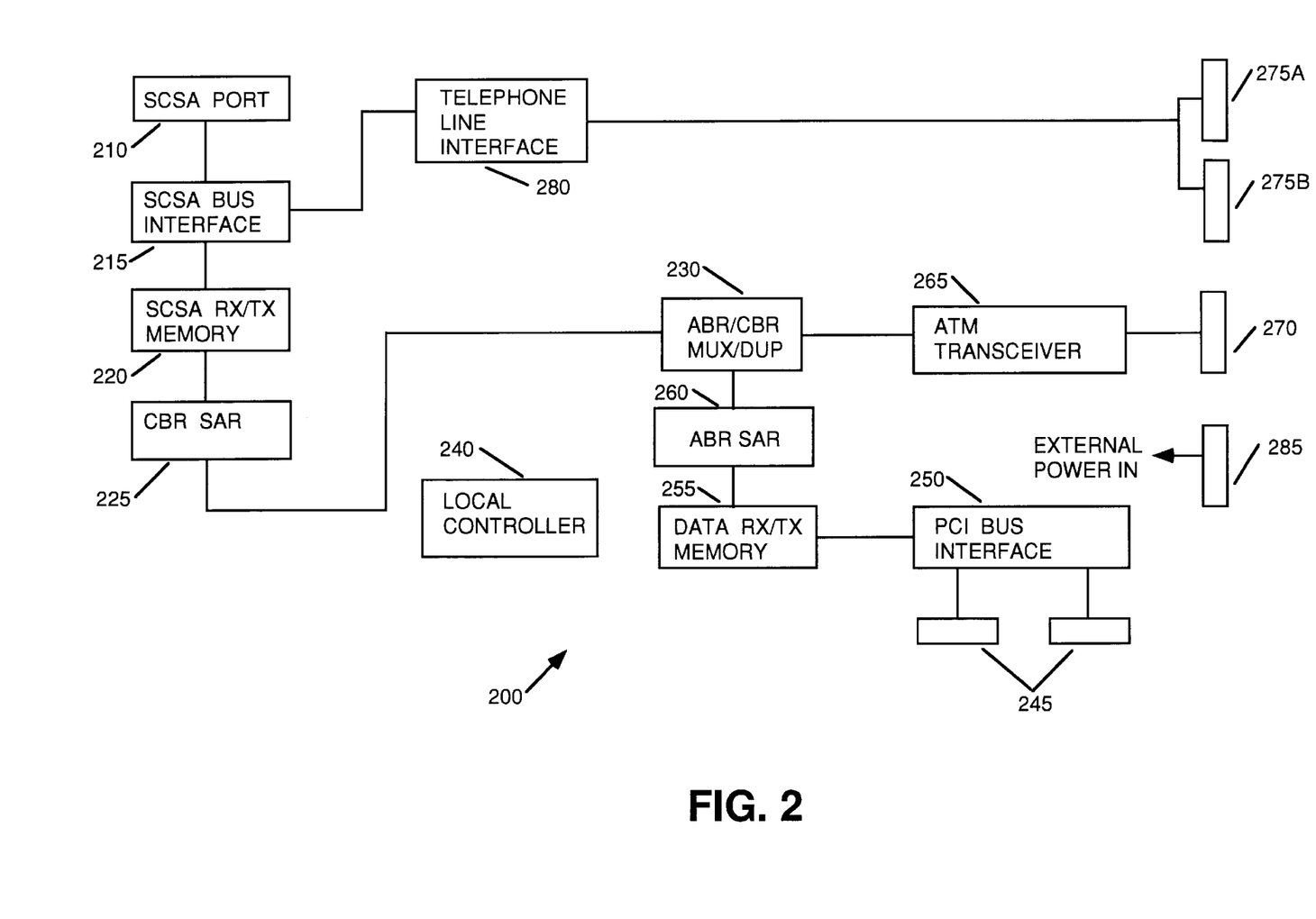
FIG. 2 is a block diagram of the network interface card of the present invention.

FIG. 2 is a block diagram of the network interface card 200 of the present invention. For convenience of explanation herein, data will be categorized as "voice data" or "information data". "Voice data" should be understood to include time critical data, such as data representative of voice signals, video signals, and other isochronous signals. Higher data throughput rates are required by some signals, such as video signals. "Information data" should be understood to include data which is not time critical, that is, data other than "voice data". Examples of "information data" are records, files, documents, applications, spreadsheets, etc.

The card 200 aggregates incoming voice data from a plurality of sources to fill an ATM cell with available voice data. When there are no voice signals to send, the card 200 fills ATM cells with information data from data devices. This minimizes delays in the transmission of voice signals and makes maximum use of the available bandwidth.

The network interface card 200 has a local controller 240, such as a microprocessor, which controls the flow of data through the network interface card 200. The card 200 has two connectors 245 which plug into the PCI slots in the host device and thereby connect the card 200 to the bus of the host device. In the environment shown, examples of host devices are personal computers 110, servers 115, 130, hub 143, etc. Other host devices may also be used. A PCI bus interface 250 is connected to the connectors 245 and provides for the exchange of information data and other communications between the card 200 and the host device. The host device may also have other connectors (not shown) which allow the host device to exchange information data between its ata bus (not shown) and devices on an external network, such as devices 170, 180 on networks 171, 181.

The local controller 240 is controllable by the host device and may communicate with the host device via the PCI bus Interface 250.

An SCSA port (connector) 210 is connected to an SCSA bus, which may be an external SCSA bus, such as link 144 of FIG. 1, or may be an internal SCSA bus in the host device. The connection between the port 210 of the card 200 and an SCSA bus is preferably accomplished via a 26-lead ribbon cable, as provided for in SCSA specifications.

An SCSA Bus Interface 215 receives and transmits digital voice data. This interface 215 preferably complies with the relevant functional, electrical, and mechanical specifications in version 3.0 of the SCSA Hardware Model Specification up to at least a system clock frequency of 4.096 MHz. The SCSA bus interface 215 is connected to the port 210 and provides for the exchange of voice data between the card 200 and the connected SCSA device. The interface 215 receives voice data, preferably for up to at least 1024 voice channels which are simultaneously active, from the external SCSA bus and maps the voice data into the SCSA RX/TX memory 220 in accordance with its voice channel identifier so that each voice channel is properly matched with the voice data therefor. The interface 215 also fetches voice data from the SCSA RX/TX memory 220, and transmits the voice data for the identified voice channels to the external SCSA bus. In addition, the interface 215 can map two local telephone ports 275A, 275B for connection to either the external SCSA bus or to the ATM network.

The SCSA bus Interface 215 can transmit and receive voice data over any of the 1024 SCSA bus TDM channels. The interface 215 can also be configured, under software control, to extract clock information from the external SCSA bus (function as a clock slave) or provide a clock signal to the external SCSA bus (function as a bus clock master). When the interface card 200 is configured to function as a bus clock master the SCSA bus Interface 215 will also support the clock fallback processes in the SCSA specifications.

The SCSA bus Interface 215 of the preferred embodiment is also capable of transmitting and receiving data packets over the SCSA message channel. The SCSA message channel is an optional high-speed serial data channel for carrying signaling information and other message packets between devices in an SCSA-compliant server. These packets are sent to and sent by the local controller 240. The local controller 240 operates upon the packets to obtain instructions or information or to forward the packets to the intended device, such as to another SCSA server via the SCSA bus or to the host device via the PCI bus interface 250. The local controller 240 may also receive packets from the host device via the PCI bus interface 250 and then place these signaling or message packets onto the SCSA message channel.

The network interface card 200 communicates with the host device via the PCI bus Interface 250. The PCI bus Interface 250 preferably complies with the functional, electrical, and mechanical specifications as outlined in IEEE P996 specifications, including interrupt and DMA capabilities, operates with a bus speed of up to 33 MHz, provides a 32 bit I/O mapped interface with hardware-selectable base address, uses one hardware-selectable interrupt level, and provides DMA support for the ABR facility (packet data transmission and reception). Although the preferred embodiment describes use with a PCI bus Interface 250, other bus architectures may also be used.

The network interface card 200 provides one path for voice data (components 210, 215, 220, 225, and 280), another path for information data (245, 250, 255, and 260), and a common path (230, 265, 270) for ATM cells. Also, a network interface card 200 may provide for multiple ATM ports 270, such as for use in the switch 143. In this case, there would be several ATM transceivers 265.

Except as noted herein, the transmission and reception of all data is accomplished under the control of the local controller 240.

Transmission Of Voice Data Onto An ATM Link

Voice data and any voice channel or other identifiers are received by the SCSA bus interface 215 via the SCSA port 210. Voice data are also received by the interface 215 from the two telephone ports 275, which are also mapped (assigned a voice channel identifier). The voice data are then stored in the SCSA RX/TX memory 220 under their associated voice channel identifiers. The local controller 240 monitors the active virtual voice circuits present at the SCSA bus Interface 215, formulates an aggregation scheme appropriate for the number of voice channels which are active at any particular time, determines what voice data is to be sent from the SCSA RX/TX Memory 220 to the CBR SAR 225, and when the data is to be sent. The local controller 240 then instructs the SCSA RX/TX Memory 220 to send the specified data to the Constant Bit Rate Segmentation And Reassembly circuit (CBR ABR) 225.

The CBR SAR 225 aggregates and formats the voice data into an ATM cell under the control of the local controller 240. The local controller 240 instructs the CBR SAR 225 to allocate time slots in a transmission cell to specified TDM channels of the SCSA bus, and which time slots are to be allocated for which TDM channels. As the data is supplied by the SCSA RX/TX Memory 220, the CBR SAR 225 loads each voice data word from each voice channel into its respective allocated slot in the transmission cell. This is then sent to the ABR/CBR MUX/DUP 230 which assembles the selected, aggregated voice data to form an ATM cell, in the order specified by the local controller 240. The completed ATM cell is sent by the MUXIDUP 230 to the ATM transceiver 265, which then transmits the ATM cell over the ATM connector 270 to an ATM link, such as link 105, 135, or 140.

More specifically, the local controller 240 will receive a management information message via the SCSA bus requesting that certain voice data channels be established. The local controller 240 will then establish those channels. This includes mapping the channel identifiers with the TDM slots. The SCSA RX/TX memory 220 will then receive the voice data and store each voice data sample under its appropriate, established voice channel identifier. Based upon the number of samples stored with each channel, and the number of established channels, the local controller 240 will then select certain voice channels, and their associated voice data, for inclusion in the next ATM cell. The local controller 240 then instructs the memory 220 to send the voice channel identifier and the voice data for the selected channels to the CBR SAR 225. The CBR SAR 225 then aggregates this information and allocates the appropriate number of ATM cell slots to each of those voice channels. The controller 240 then instructs CBR SAR 225 to send the aggregated information to the MUX/DUP 230. The MUX/DUP 230 then assembles the ATM cell, and sends the completed ATM cell to the ATM transceiver 265.

The present invention thus maximizes bandwidth efficiency and complies with ATM specifications through voice channel aggregation. Voice channel aggregation comprises aggregating the digitized voice words (voice data) from the synchronous voice data bus, such as the SCSA bus, before transmitting the voice data over the asynchronous ATM network link. The aggregation is achieved by allocating one of more time division slots in an ATM transmission cell to each of a plurality of selected voice channels. The number of voice data samples for any voice channel is limited to eight samples, thereby allowing off-the-shelf echo correction devices to be used to remove any echoes.

In the preferred embodiment, the CBR SAR 225 aggregates six voice TDM channels into one ATM cell by inserting the voice data in a series fashion in the ATM cell. However, more or fewer voice TDM channels may be aggregated, depending upon the number of TDM channels requiring service. For example, if there are six channels, V1–V6, and the voice samples are, in time sequence, V1a, V1b, V1c, etc., then the voice samples will be loaded into the ATM cell as V1a–V6a, V1b–V6b, V1c–V6c, V1d–V6d, V1e–V6e, V1f–V6f, V1g–V6g, V1h–V4h. It should be recalled that there are 46 bytes available for the data. Therefore, with 6 voice channels, each voice channel can send 7 samples, and 4 of the voice channels can send an additional, eighth sample. It will be noted that the last sample loaded in this example is V4h, not V6h. Voice channels V5 and V6 do not lose the last sample, however. These samples are loaded into the next ATM cell so that it has V5h–V6h.

However, at this point, the next samples for V1–V6 are not yet available, because voice samples are obtained at 125 microsecond intervals. Therefore, V5h and V6h will be transmitted, possibly along with voice data from other voice channels, for example V7–V10.

If there is a large number of active channels then the channels may be aggregated into two or more distinct groups. For example, voice channels 1–5 may go into a first ATM cell, voice channels 6–10 may go into a second ATM cell, voice channels 11–15 may go into a third ATM cell, etc., with each voice channel being allocated an ATM cell into which its data will be placed every millisecond. Other aggregation schemes are also possible. For example, one sample from each of channels 1–46 may go into a first ATM cell, one sample from each of channels 47–92 may go into a first ATM cell, one sample from each of channels 93–138 may go into a first ATM cell, etc., with each voice channel being allocated an ATM cell into which its data will be placed every 125 microseconds. The particular aggregation scheme is not important so long as each voice channel is permitted to send eight voice data samples during every 1 millisecond interval. Within that eight sample constraint, each ATM cell used for transmitting voice data should contain as many voice data samples as possible so as to maximize efficiency. In the preferred embodiment, considering the allowable delay time as discussed above, at least six channels are aggregated, with no more than eight data words being sampled per channel for each ATM cell transmitted.

The number of samples for each channel which can be sent in a single ATM cell is a function of the length of transmission delay which the echo suppression hardware will tolerate. A more robust echo suppression scheme will tolerate a greater transmission delay and the number of sample words collected per channel can be increased accordingly.

Transmission Of Information Data Onto An ATM Link

With respect to information data, the local controller 240 will receive a management information message via the PCI bus requesting that certain information data channels be established. The local controller 240 will then establish those information data channels. The DATA TX/RX Memory 255, the ABR SAR 260, and the PCI Bus Interface 250 operate under the control of the host device. The host device advises the DATA TX/RX Memory 255 when there is information data available to be transmitted, and what information data channels are specified for the information data. Information data transfers between the DATA TX/RX Memory 255 and the host device are then accomplished using DMA access via the PCI ports 245.

The local controller 240 instructs the DATA RX/TX memory 255 to send information data words to the ABR SAR 255. The ABR SAR 255 will then affix the proper information data channel identifier(s). The ABR SAR 260 is functionally equivalent to the CBR SAR 225 in most respects. However, the ABR SAR merely formats the data from the PCI Bus Interface 250 into an ATM transmission cell, retaining the channel identifier for the data, but without retaining the constant bit rate information because such information is not needed. Similar SARs (CBR SAR, ABR SAR) can be used for each device supported by the ATM interface card 200. The present invention supports multiple SCSA busses, multiple computer data busses, and combinations thereof, depending on the particular application. The ABR SAR 260 preferably supports a minimum of one thousand virtual circuits using the AAL5 ATM adaptation layer cell format. The ABR SAR 260 aggregates information data as needed to fill an ATM cell.

The local controller 240 instructs the ABR SAR 260 to forward information data to the MUX/DUP 230. The ABR/CBR MUX/DUP 230 then assembles the selected, aggregated information data to form an ATM cell, in the order specified by the local controller 240. The completed ATM cell is sent by the MUX/DUP 230 to the ATM transceiver 265, which then transmits the ATM cell over the ATM connector 270 to an ATM link, such as link 105, 135, or 140.

Thus, in the transmission direction, the MUX/DUP 230 operates as a switch to selectively route data to the ATM transceiver 265 from the ABR SAR 260, the CBR SAR 225, or the local controller 240.

In order to ensure that the voice data does not suffer an intolerable time delay, the local controller 240 gives priority to traffic in the CBR format (adaptation layer AAL1). If there is no voice data to be transmitted then, under the control of the local controller 240, information data is transmitted.

It will seen from the above that, even when voice data is being transmitted, each ATM cell is filled as completely as possible with voice data so that bandwidth is not wasted, and it will be seen that ATM cells are also sent at a time dictated by the CBR requirements of the voice data being sent. This results in increased efficiency and permits ATM technology to be used as a telephony network backbone.

The ATM Transceiver 265 is a conventional off-the-shelf ATM transceiver, such as the Integrated Devices Technology integrated circuit ATM transceiver 64STQFP, which meets the recommendations of the ATM Forum for 25 Mbps full-duplex twisted pair transmission. The ATM Interface connector 270 provides the physical connection between the ATM transceiver 265 and an ATM link 105, 135, 140.

Reception Of Data From An ATM Link

In the reception direction, the ATM Transceiver 265 receives network traffic from the ATM Interface 270. The ATM Transceiver 265 converts the network traffic into ATM cells, and forwards the ATM cells to the MUX/DUP 230 for processing. However, it should be noted that ATM cells may contain either voice data or information data. When the network interface card 200 is first powered up, or is reset, there may be network traffic already present on the bus. However, the local controller 240 will not have any information on what device is intended to receive the information. If the ATM cell is sent to only one SAR 225, 260 then data, intended for the other SAR, would be lost. Therefore, initially, the local controller 240 instructs the MUX/DUP 230 to duplicate the ATM cell and send one copy of the ATM cell to the CBR SAR 225, and one copy of the ATM cell to the ABR SAR 260. The SARs 225, 260 disassemble the ATM cell, verify the channel identifiers as provided by their respective bus interfaces, and route any valid channel identifiers and associated data to their respective memories 220, 255. If an SAR 225, 260 finds that a cell does not identify an established channel assignment then that cell is discarded by that SAR. The SARs 225, 260 will also advise the local controller of any such channel identifiers. The local controller 240 will instruct the SCSA memory 220 to attach a voice channel identifier number to each voice data sample and send the combination to the SCSA interface 215, which then places the combination on the SCSA bus. The host device causes the information data to be read from the DATA memory 255 via the PCI ports 245 via a DMA operation.

This cell duplication and separate checking procedure eliminates the likelihood that a cell will not get to the proper SAR 225, 260 because the local controller 240 did not have channel identifier information.

However, as controller 230 begins setting up and taking down channel assignments, the controller 240 learns which channel identifiers are associated with which SARs. Therefore, the controller 240 then instructs the MUX/DUP 230 to send packets with voice channel identifiers to the CBR SAR 225, and to send all other packets to the ABR SAR 260. This improves the efficiency by routing the packets properly while assuring that packets do not get misrouted during the initialization or startup of the card 200. Of course, it is possible to always duplicate and forward the ATM to both SARs as insurance that the local controller 240 will not cause data to be incorrectly routed.

Under control of the local controller 240, the CBR SAR 225 tests the received cell virtual circuit identifier in the header field of the cell before operating on the payload data. If the cell is intended only for the ABR SAR 260 then the cell virtual circuit identifier will be one which the CBR SAR 225 does not recognize, so the CBR SAR 225 will discard that cell. If the cell is intended for a device connected via the SCSA bus (or to the telephone ports 275) then the cell virtual circuit identifier will match an established cell voice channel identifier, so the cell will be processed by the CBR SAR 225. The CBR SAR 225 will segregate the voice data in the ATM cell components by the voice channel identifier, and send the voice data and the channel identifier to the SCSA RX/TX memory 220, where the voice data is stored under its voice channel identifier. The voice data then resides in the SCSA RX/TX memory 220 until the local controller 240 instructs that the voice data is to be sent to the SCSA Bus Interface 215. The SCSA RX/TX memory 220 then provides the voice data and the voice channel identification to the SCSA bus interface 215 for transmission over the SCSA port 210.

The ABR SAR 260 operates in a manner similar to the CBR SAR 225. Under control of the local controller 240, the ABR SAR 260 tests the received cell virtual circuit identifier in the header field of the ATM cell before operating on the payload data. When a received ATM cell is sent to the ABR SAR 260 by the ABR/CBR MUX/DUP 230, the ABR SAR 260 verifies that the received cell virtual circuit identifier in the header field of the ATM cell matches an established information channel. If the cell is intended for a device connected via the PCI bus then the cell virtual circuit identifier will be one which the ABR SAR 260 will recognize so the ABR SAR 260 will segregate the information data in the ATM cell components by the information channel identifier, and send the information data and the information data channel identifier to the DATA RX/TX memory 255. The DATA RX/TX memory 255 then provides the information data to the PCI bus interface 250 for transmission over the PCI ports 245 when the information data for that information data channel identifier is requested by the host device.

Telephone Device Interface Capability

In the preferred embodiment, the network interface card 200 includes two telephone ports 275A, 275B which are independently hardware configurable. The telephone ports 275 can be configured to accept any desired telephone connector, including RJ-11-4, RJ-11-6, etc. Each telephone port 275 can be configured to function as a telephone set, a subscriber line interface, or a direct audio-in/audio-out circuit. The configuration is selected by controlling a telephone line interface circuit 280.

The telephone line interface 280 is connected to the SCSA bus interface 215. The telephone line interface 280 can detect a digital "ring" signal which is provided by the SCSA bus interface 215, can provide an analog ringing signal and voltage to a port 275, can seize a digital telephone line which is provided by the SCSA bus interface 215, can provide DC telephone power for short loops (<1000 feet), can supervise the line (loop start operation), can detect pulse dialing and DTMF signaling, can transmit to the SCSA bus interface 215 signals corresponding to pulse dialing, can transmit to the SCSA bus interface 215 signals corresponding to tone dialing, can receive and originate telephone calls, can provide audio duplexing (2 to 4 wire conversion), and can provide the proper DC feed and termination for an audio-in circuit, and proper drive for an audio-out circuit, to directly interface with a conventional telephone handset, such as the ATT 500 telephone handset. The telephone interface 280 performs the necessary functions for the selected configuration for each port 275. In addition, the telephone interface includes a CODEC (COder/DECoder) for each telephone port 275. The CODEC (not shown separately) converts analog audio signals at the telephone port 275 into PCM encoded digital format signals (voice data), and converts voice data into analog audio signals for the telephone port 275. The receive voice data and the transmit voice data for each telephone port 275 can be mapped onto any SCSA bus channel. Power for providing a ringing signal, and power for providing DC telephone operating power, are provided by external power sources (not shown) via a connector 285.

If a telephone port 275 is to function as a subscriber line interface, the telephone line interface circuit 280 is configured to provide power for short loops, supply ringing to the line, supervise the line, detect pulse dialing and DTMF signaling, and provide the audio duplexing capability. This configuration is useful for providing a port 275 which functions with a conventional analog telephone set.

If a telephone port 275 is to function as audio-in/audio-out circuit, the telephone line interface circuit 280 is configured to provide proper DC feed and termination for the audio-in circuit, and proper drive for the audio-out circuit. This configuration is useful for providing a port 275 which functions directly with a telephone handset, such as an agent position which has only a handset/headset and a computer station.

If a telephone port 275 is to function as a telephone set, the telephone line interface circuit 280 is configured to receive and originate telephone calls, detect ringing, seize the telephone line, pulse and tone dial, transmit and detect DTMF tones, and provide the audio duplexing capability. This configuration is useful such as when the card 200 is to simulate a telephone set to a connected PABX, or is to provide a voice channel from an ATM link to a PABX without use of a TDM data bus.

Figure 3:
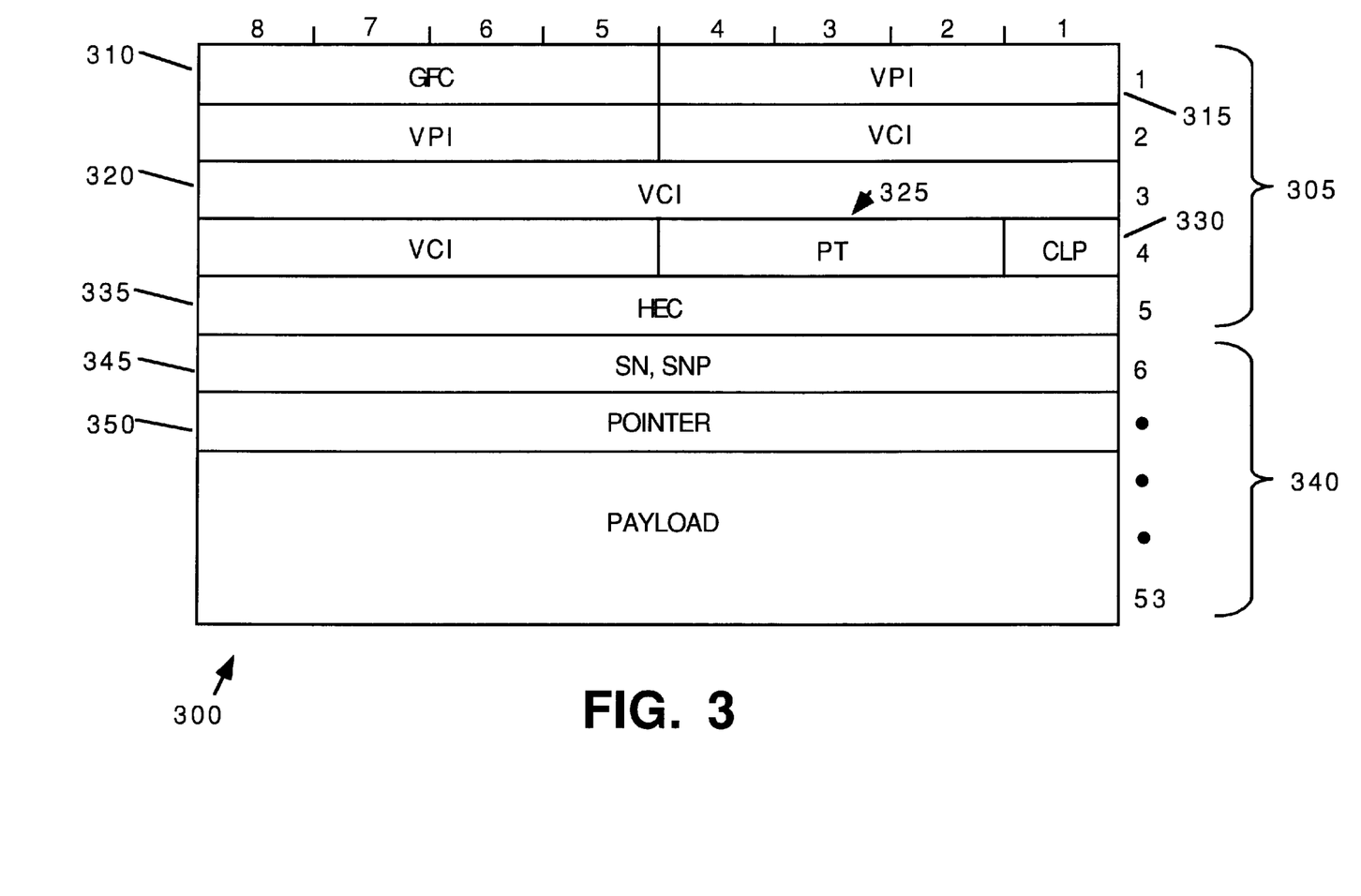
FIG. 3 is an illustration of a typical ATM transmission cell used by the present invention.

FIG. 3 is an illustration of a typical ATM transmission cell 300 used by the present invention. The ATM cell 300 construction is dictated primarily by the ATM specifications. The ATM cell 300 is a 53-octet package composed of a 5 or 6 octet header field 305 and a 46 to 48 octet payload 340. The number of header field 305 octets and the number of payload 340 octets actually used depend on the adaptation layer of the data. All 48 octets of the payload 340 can be dedicated to transferring bit-rate tolerant data in the ABR adaptation layer AAL5. However, the CBR adaptation layer AAL1 makes use of certain octets 345, 350 in the payload 340 in order to maintain the bit rate and the channel assignment of the recreated signal.

The header field 305 contains a Virtual Path Identifier (VPI) field 315 and a Virtual Channel Identifier (VCI) field 320. Those two fields 315, 320 together identify the virtual circuit owning the payload 340. It is these two fields which allow the CBR SAR 225 and the ABR SAR 260 to identify whether the payload belongs to an active virtual circuit at that SAR. The header field 305 also contains other information, such as a Generic Flow Control (GFC) field 310, a Payload Type (PT) field 325, a Cell Loss Priority (CLP) field 330, and a Header Error Control (HEC) field 335. In addition, an AAL1 type cell will also contain sequence number and sequence number protection fields 345, which also contain the clock information and indicate whether the cell is a "P format" cell, and will may also have a pointer field 350 if the cell is a "P format" cell. These fields provide ATM network protocol functionality, such as error correction and flow control.

Figure 4:
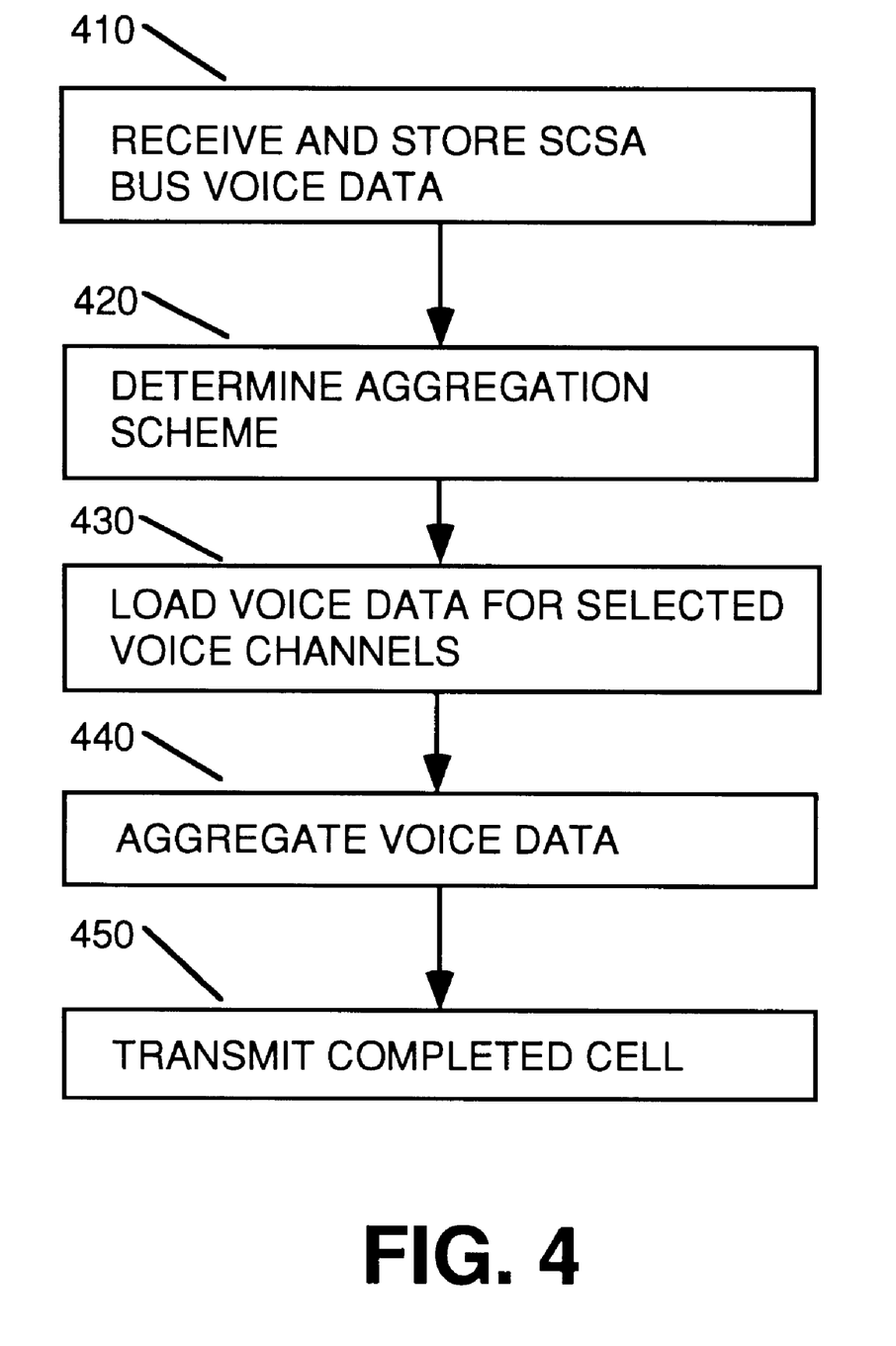
FIG. 4 is a flow chart illustrating the transmit mode operation of the present invention.

FIG. 4 is a flow chart illustrating the transmit mode operation of the present invention. At step 410, the channel identifier information and the digitized voice data from the SCSA bus for a plurality of channels is received via port 210. Each channel represents an independent virtual circuit. This voice data is received in TDM format.

At step 420, an aggregation scheme appropriate for the number of channels carrying active virtual circuits is constructed. For example, if there are 46 active voice channels, then the aggregation scheme may be to use one sample from each active voice channel. If there are 23 active channels, the aggregation scheme may be to use two samples from each active voice channel. If there are few active voice channels, then the aggregation scheme may be to use several samples from those voice channel. Other aggregation schemes are possible. Further, the aggregation scheme may be fixed, and not variable, so that a fixed number of samples are used from each active voice channel any time data for that voice channel is transmitted. For example, the fixed aggregation scheme may specify that eight samples will be used for a voice channel each time that voice channel is selected.

At step 430, one slot in an ATM cell is allocated for each voice data sample for each channel to be aggregated. No more than eight samples from any voice channel are placed in an ATM cell in order to achieve less than 1 millisecond of origination delay. After each selected channel is allocated the proper number of slots for the voice data in the ATM cell, the voice data for the selected channels is read from the SCSA memory 220.

At step 440, the voice data is aggregated. As each voice data word for each channel is read, the voice data word is stored in the transmission cell slot allocated to that channel. This process continues, and the transmission cell is loaded with words read from the SCSA memory 220, until the determined number of words for the determined number of voice channels has been loaded. In the preferred embodiment, 8 words from each voice channel are loaded into an ATM cell. Accordingly, a transmission cell will become filled every millisecond.

At step 450, once the local controller 240 has caused the desired information to be loaded in to the cell, the completed cell is forwarded to the ATM Transceiver 265 for transmission over the ATM network link.

After the ATM cell has been completed and forwarded for transmission the process repeats. It will be appreciated that step 410 is a continuous process and that step 420 is driven by the presence or absence of data received at step 410. There will be times when there is little voice data to be transmitted and a cell may not be completely filled. There will also be times when there is no voice data to be transmitted. When the controller 240 is not causing voice data to be sent then the controller will cause ATM cells to be filled with information data and then transmitted.

Figure 5:
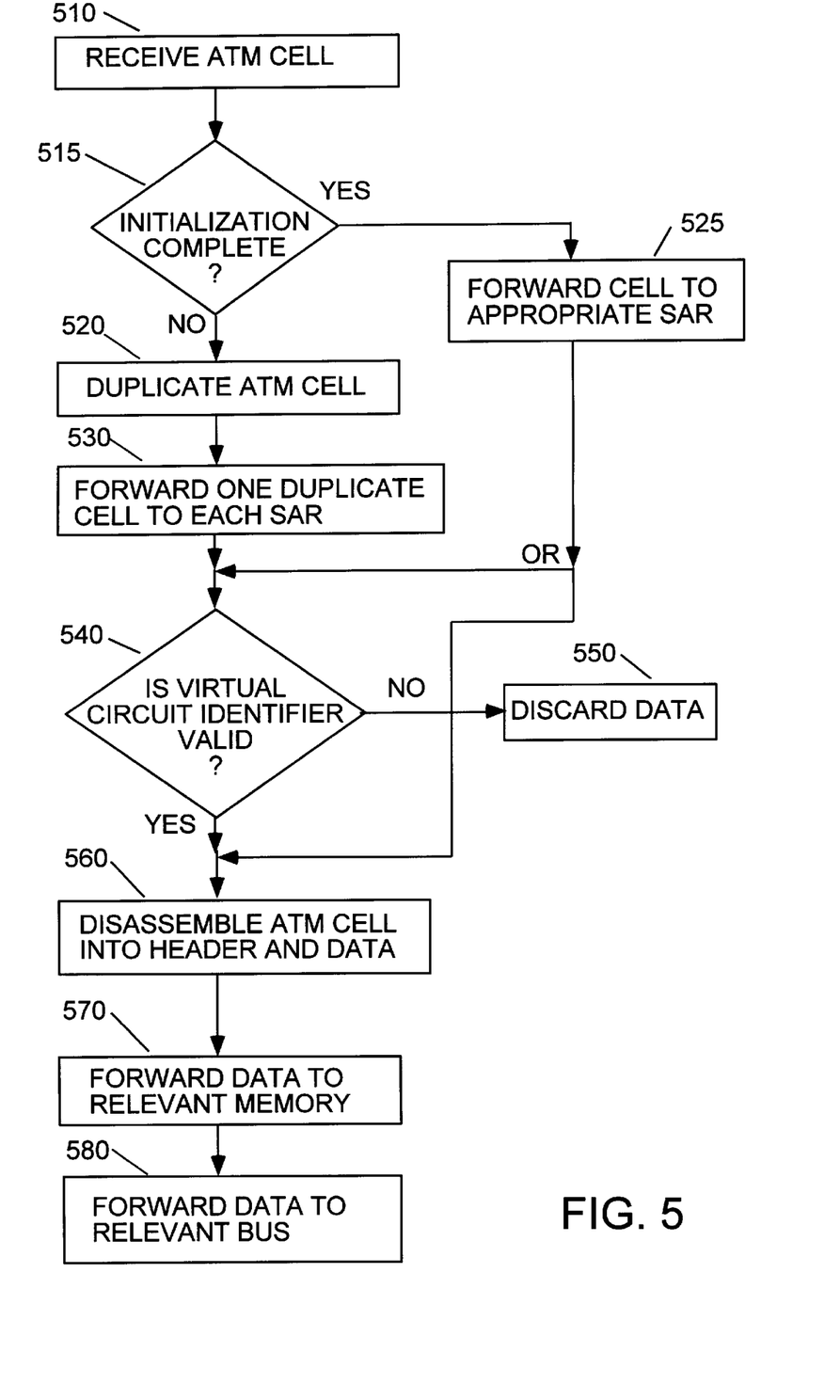
FIG. 5 is a flow chart illustrating the receive mode operation of the present invention.

FIG. 5 is a flow chart illustrating the receive mode operation of the present invention. As mentioned above, the present invention overcomes the problem of determining whether an incoming transmission cell is directed to the SCSA bus or to the PCI bus by duplicating the received ATM cell and directing the duplicate ATM cells in both directions, one duplicated ATM cell to the SCSA bus and the other duplicated ATM cell to the PCI bus.

At step 510, an ATM cell is received over an ATM link and forwarded to the MUX/DUP 230.

At step 515 the controller determines whether initialization is complete, that is, does the controller have channel identifier information on which to make a determination as to how the cell should be routed. If not, then step 520 is executed.

If so, then at step 525 the controller causes the MUX/DUP 230 to forward the cell to the appropriate SAR, which will then execute either step 540 or step 560, depending on whether it is desirable to again verify the channel identification information.

At step 520, the MUX/DUP 230 duplicates the received cell such that there are two cells substantially identical to the received cell.

At step 530, the MUX/DUP 230 forwards the duplicate cells in both data path directions. A duplicate cell is forwarded to each receiving device: one cell is forwarded to the CBR SAR 225, and the other cell is forwarded to the ABR SAR 260.

At step 540, each SAR 225, 260 tests the cell to determine if the cell should be forwarded to a device on its bus (SCSA, PCI) by testing the virtual circuit identifier within the cell to determine if it matches a virtual circuit identifier recognized by it for a device on its respective bus (SCSA, PCI).

If at step 540 the relevant SAR does not recognize the virtual circuit identifier as a valid virtual circuit identifier then that SAR discards the cell as unrecognized in step 550.

If at step 540 the relevant SAR recognizes the virtual circuit identifier as a valid virtual circuit identifier the SAR does not discard the cell but, in step 560, disassembles the cell into its payload and header components. These components are then matched to the proper virtual circuit.

At step 570, the SAR 225, 260 forwards the data to the relevant memory 220, 255 for storage under the channel identifier/virtual circuit for the intended recipient.

At step 580, under control of either the local controller 240 (voice data) or the host device (information data), the data is placed on the port 210, 275, or bus 245, where it is then forwarded to the proper recipient.

From the foregoing description, it will be apparent that the present invention provides for transmitting synchronous digitized voice data, as well as digital computer data, over an asynchronous network protocol, such as the Asynchronous Transmission Mode, in a manner which delivers the voice data in a timely manner while maintaining efficient use of the available bandwidth.

Alternative embodiments of the present invention will become apparent to those skilled in the art from the disclosure herein without departing from its spirit and scope.

I claim:

1. An apparatus for transmitting isochronous information over an asynchronous network, comprising:

a memory for receiving a plurality of isochronous data words for a plurality of isochronous channels, each said isochronous data word being associated with a predetermined isochronous channel, said isochronous data words for a said isochronous channel being generated at a sampling rate predetermined for that channel, each said isochronous channel having a predetermined maximum acceptable delay time;

an aggregator for receiving selected ones of said isochronous data words of said plurality of isochronous data words from said memory and aggregating said selected ones of said isochronous data words to provide an aggregation of selected isochronous data words for selected isochronous channels;

a controller for, at a rate determined by the least said predetermined maximum delay time, repeatedly selecting channels of said plurality of isochronous channels, selecting said selected ones of said isochronous data words of said plurality of isochronous data words for each selected isochronous channel, said number of data words for a selected channel having a maximum determined by said sampling rate and said maximum acceptable delay time for that selected channel, causing said aggregator to receive and aggregate, and sending an instruction to assemble a data transmission packet;

a multiplexer responsive to said instruction for assembling a said data transmission packet from each said aggregation; and a transmitter for transmitting each said data transmission packet over said asynchronous network.

2. An apparatus for receiving isochronous information over an asynchronous network, comprising:

a receiver for receiving a transmission cell transmitted over an asynchronous network;

a duplicator for duplicating said received transmission cell to provide two received cells;

a first circuit for receiving one of said received cells, for determining whether said received cell has an identifier recognized by said first circuit, for discarding said received cell if said identifier is not recognized, and for forwarding at least selected portions of said received cell if said identifier is recognized;

a first interface for receiving said selected portions from said first circuit and for sending said selected portions as isochronous data words for a plurality of isochronous data channels;

a second circuit for receiving the other of said received cells, determining whether said received cell has an identifier recognized by said second circuit, for discarding said received cell if said identifier is not recognized, and for forwarding at least selected portions of said received cell if said identifier is recognized; and a second interface for receiving said selected portions from said second circuit and for sending said selected portions as non-isochronous data words for at least one data channel.

3. A method for transmitting isochronous information over an asynchronous network, comprising the steps of:

receiving a plurality of isochronous data words for a plurality of isochronous channel, each said isochronous data word being associated with a predetermined isochronous channel said isochronous data words for a said isochronous channel being generated at a sampling rate predetermined for that channel, each said isochronous channel having a predetermined maximum acceptable delay time;

at a rate determined by the least said predetermined maximum delay time, repeatedly, selecting channels of said plurality of isochronous channels;

selecting ones of said isochronous data words of said plurality of isochronous data words for each selected channel the number of data words for a selected channel having a maximum determined by said sampling rate and said maximum acceptable delay time for that selected channel;

aggregating said selected ones of said isochronous data words to provide an aggregation of selected isochronous data words for selected isochronous channels;

assembling a said data transmission packet from each said aggregation; and transmitting each said data transmission packet over said asynchronous network.

4. A method for receiving isochronous information over an asynchronous network, comprising the steps of:

receiving a transmission cell transmitted over said asynchronous network;

duplicating said received transmission cell to provide two received cells;

determining whether one of said received cells has an identifier matching a first valid identifier, discarding said received cell if said identifier does not match, and forwarding at least selected portions of said received cell if said identifier does match;

sending said selected portions of said received cell as isochronous data words for a plurality of channels;

determining whether the other one of said received cells has an identifier matching a second valid identifier, discarding said received cell if said identifier does not match, and forwarding at least selected portions of said received cell if said identifier does match; and sending said selected portions of said other received cell as non-isochronous data words for a data channel.

5. A method for receiving isochronous information over an asynchronous network, comprising the steps of:

receiving a transmission cell transmitted over said asynchronous network;

determining whether channel identification information has been previously provided;

if said channel identification information has not been previously provided then:

duplicating said received transmission cell to provide two received cells;

determining whether one of said received cells has an identifier matching a first valid identifier, discarding said received cell if said identifier does not match, and forwarding at least selected portions of said received cell if said identifier does match;

sending said selected portions of said received cell as isochronous data words for a plurality of channels;

determining whether the other one of said received cells has an identifier matching a second valid identifier, discarding said received cell if said identifier does not match, and forwarding at least selected portions of said received cell if said identifier does match; and sending said selected portions of said other received cell as non-isochronous data words for a data channel;

if said channel identification information has been previously provided then sending said received cell to a device identified by an identifier in said received cell.

6. The apparatus of claim 1, and further comprising:

an asynchronous data memory for receiving a plurality of asynchronous data words; and wherein, said controller determines the number of isochronous data words in said aggregation and, if said number of said isochronous data words in said aggregation is less than a maximum number of data words allowable in a data transmission packet, then said controller selects ones of said plurality of asynchronous data words and causes said aggregator to receive and aggregate said selected ones of said plurality of asynchronous data words; and wherein said aggregator receives said selected asynchronous data words of said plurality of asynchronous data words from said memory and aggregates said selected asynchronous data words with said selected isochronous data words to provide said aggregation.

7. The method of claim 3, and further comprising:

receiving a plurality of asynchronous data words; and determining the number of isochronous data words in said aggregation; and if said number of said isochronous data words in said aggregation is less than the maximum number of data words allowable in a data transmission packet, then selecting ones of said plurality of asynchronous data words;

said step of aggregating further comprises aggregating said selected ones of said plurality of asynchronous data words with said selected ones of said isochronous data words to provide said aggregation.

8. The method of claim 3, wherein said isochronous channels have the same predetermined maximum acceptable delay time, and wherein said isochronous channels have the same sampling rate for generating said isochronous data words, and further comprising:

aggregating a first number of said isochronous data words for a first number of said isochronous channels with a second number of said isochronous data words for a second number of said isochronous channels to provide a first said aggregation, said second number of isochronous data words being less than said first number of isochronous data words by a difference amount of isochronous data words;

aggregating said difference amount of isochronous data words for said second number of said isochronous channels to provide a second said aggregation.

9. The method of claim 3, wherein said isochronous channels have the same predetermined maximum acceptable delay time, and wherein said isochronous channels have the same sampling rate for generating said isochronous data words, and further comprising:

aggregating M1 of said isochronous data words for N1 of said isochronous channels with M2 of said isochronous data words for N2 of said isochronous channels to provide a first said aggregation, M2 being less than M1 by D isochronous data words;

aggregating D isochronous data words for said N2 isochronous channels to provide a second said aggregation.

* * * * *